Figure 1:
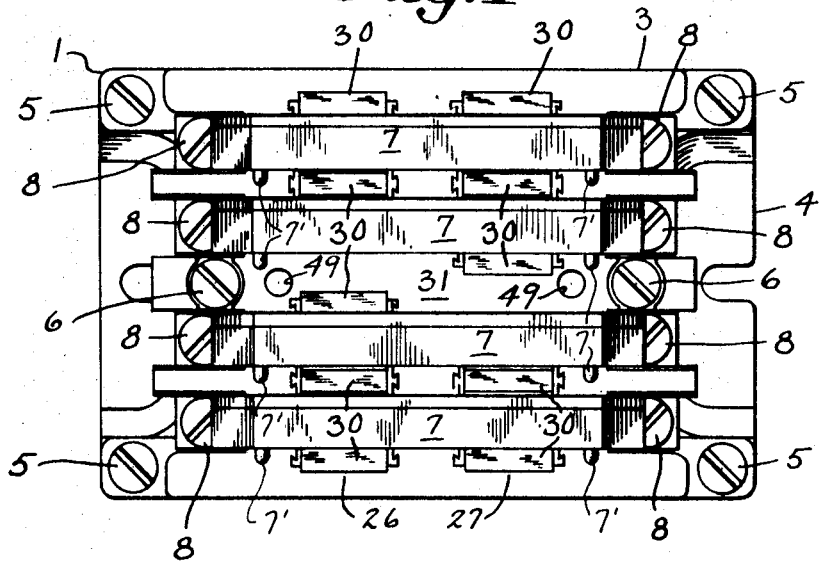

United States Patent

[11] 3,605,049

[72] Inventor Wayne H. Wielebski
    Milwaukee, Wis.
[21] Appl. No. 2,023
[22] Filed Jan. 12, 1970
[45] Patented Sept. 14, 1971
[73] Assignee Allen-Bradley Company
    Milwaukee, Wis.

[54] SEALED CONTACT RELAY
    9 Claims, 12 Drawing Figs.
[52] U.S. Cl. .................................................. 335/152,
    335/153
[51] Int. Cl. ................................................ H01h 50/04,
    H01h 50/08, H01h 50/40, H01h 51/28
[50] Field of Search ........................................ 335/151-154,
    202

[56] References Cited
    UNITED STATES PATENTS
    3,492,613   1/1970   Van Husen ................. 335/151
    3,508,180   4/1970   Mayer ........................ 335/152

Primary Examiner—Bernard A. Gilheany
Assistant Examiner—R. N. Envall, Jr.
Attorneys—Allan W. Leiser and Arthur H. Seidel ABSTRACT: A sealed contact relay has a plurality of sealed switches each enclosed in a modular cartridge. The relay structure has a U-shaped yoke made of magnetic material with two coils, one surrounding each leg of the yoke. A set of spaced magnetic flux fingers extend from the end of each leg of the yoke and in the same general direction. The cartridges are removably mounted between the spaced flux fingers of each set and bridge across the magnetic gap between the two sets of flux fingers. An indicator cap is attached to the top of the relay having a pivotally mounted indicator arm which swings away from a spring-biased position when the coils are energized. In another embodiment, a manual actuator is provided and has a magnet that can be moved into magnetic contact with the flux fingers to cause flux to flow in either direction through them.

PATENTED SEP 14 1971 3,605,049

SHEET 1 OF 4

INVENTOR
WAYNE H. WIELEBSKI

BY Arthur H. Seidel

ATTORNEY

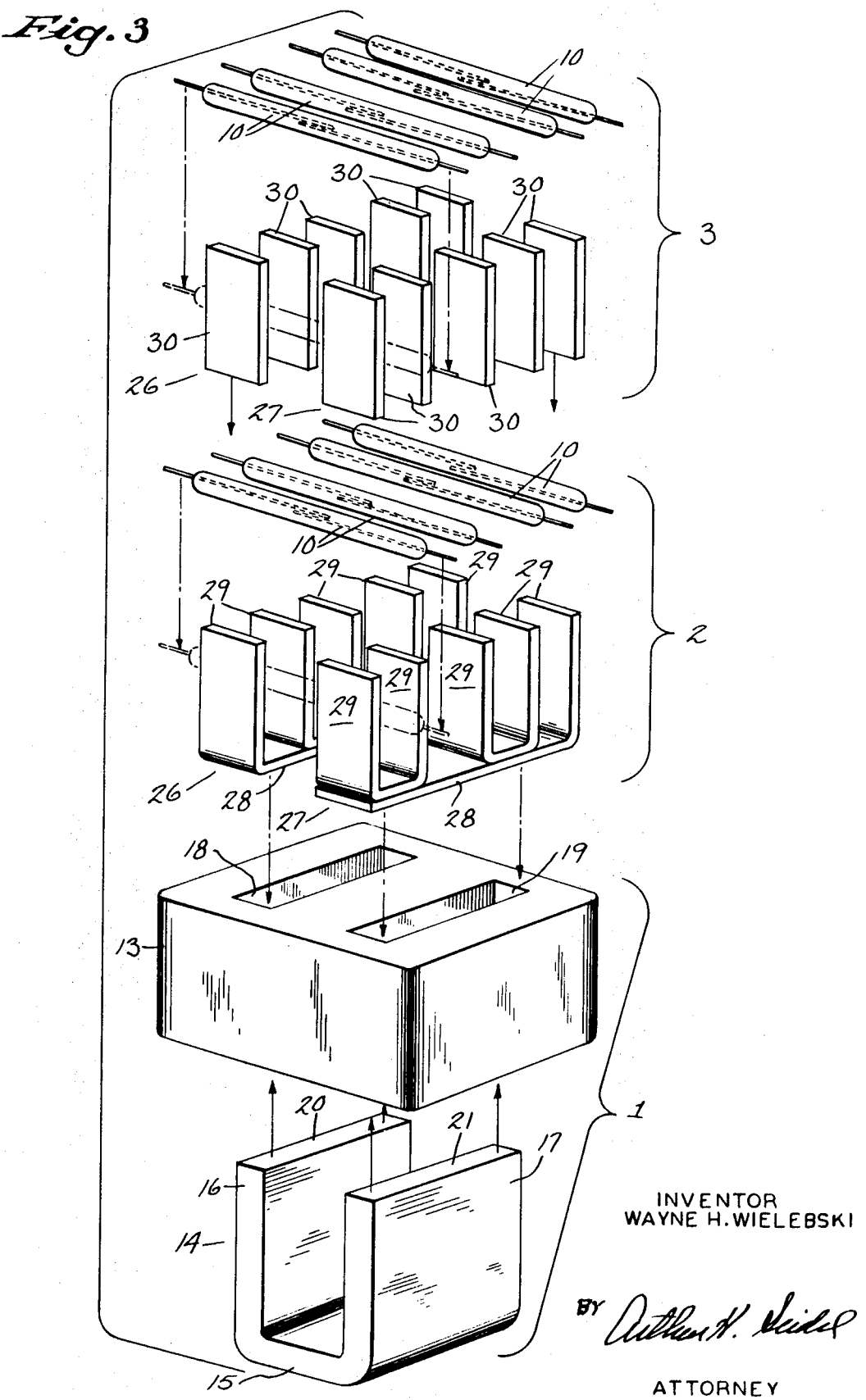

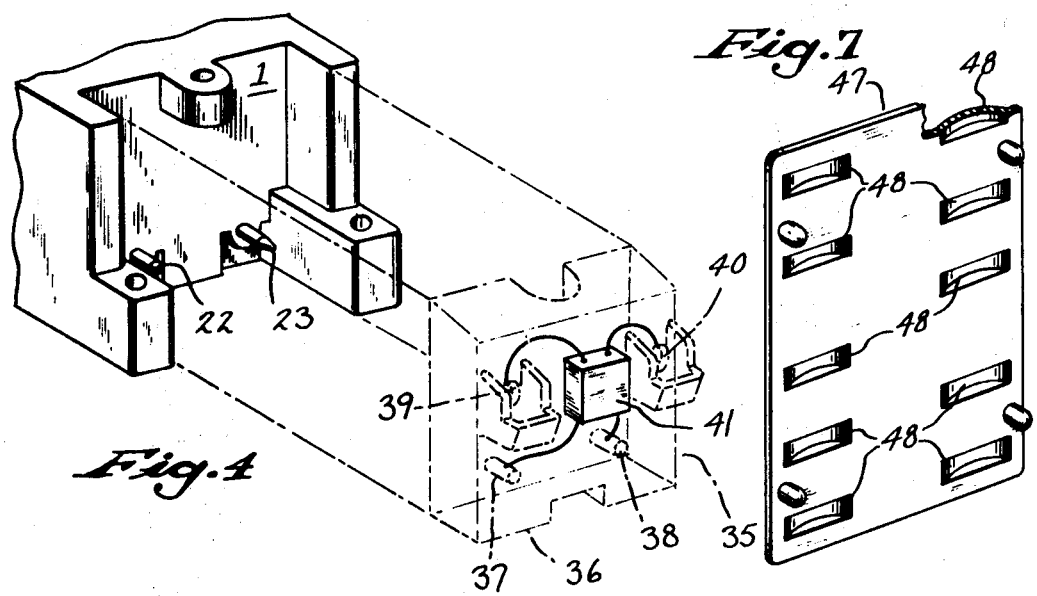
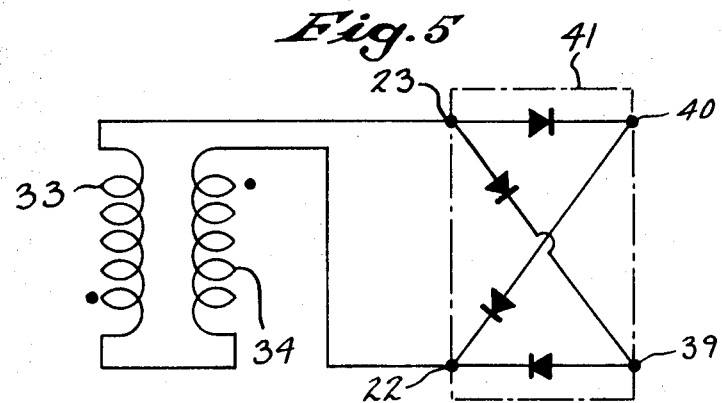
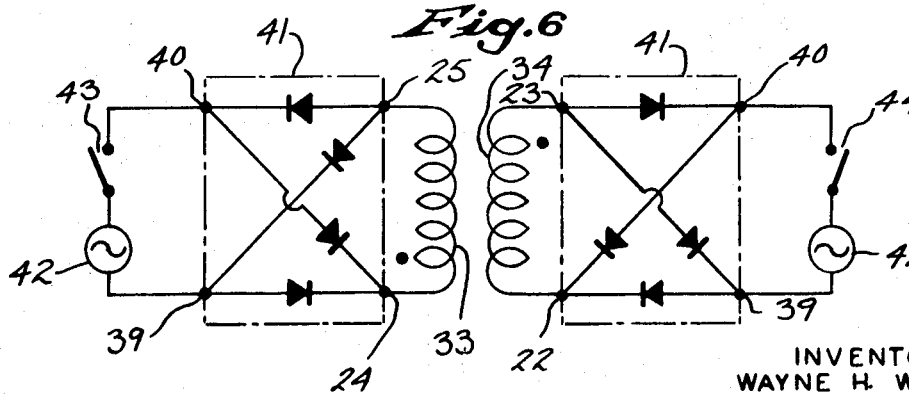

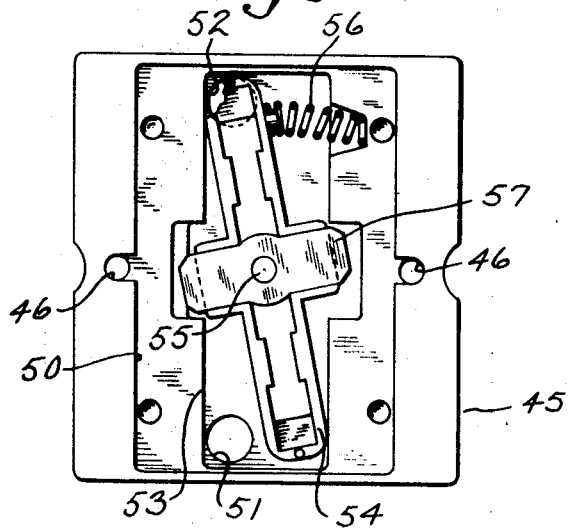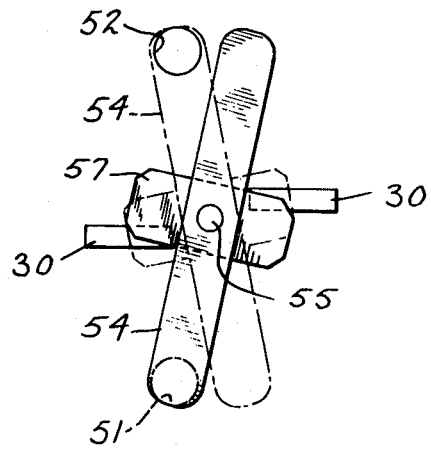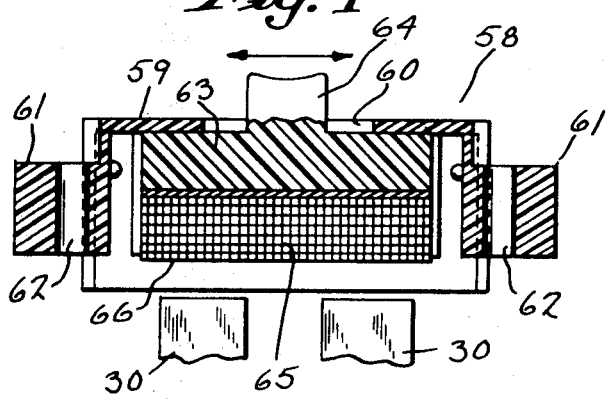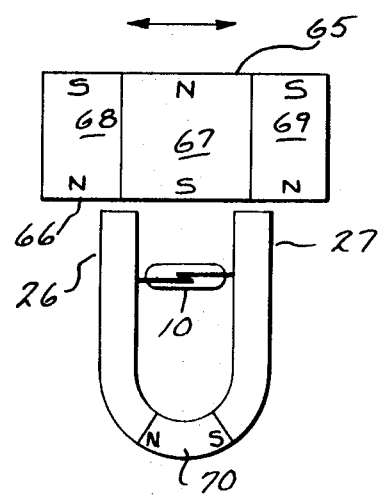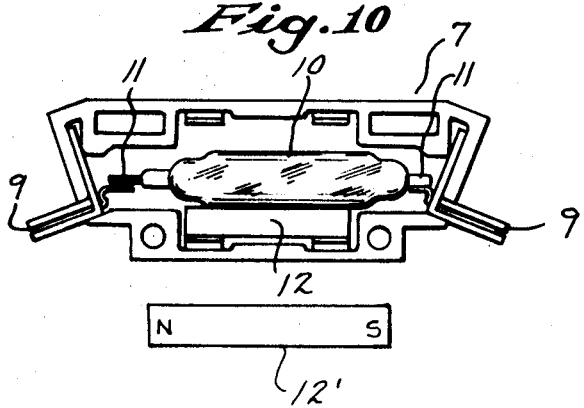
INVENTOR
WAYNE H. WIELEBSKI
BY Arthur H. Seidel
ATTORNEY

SEALED CONTACT RELAY

BACKGROUND OF THE INVENTION

This invention relates to electrical relays, and more particularly to a relay having a plurality of magnetically responsive, sealed switches. Such sealed contact switches are known for their high reliability, speed of operation and suitability for use in adverse operating environments. The basic reed type of switch includes elongated, overlapping reed members which act as both current and flux conductors. These reeds are usually enclosed in a sealed glass envelope filled with an inert gas. When flux flows across the gap between the overlapping reed members they are pulled together to make electrical contact. This type of switch is both reliable and very simple, but has a relatively low current capacity.

Another type of sealed contact switch is similarly enclosed and operated, but uses a different type of movable member to effectively separate the magnetic gap from the electrical contact, thus allowing for a higher current capacity. A typical switch of this type is described in U.S. Pat. No. 3,317,869.

Both of the foregoing types of switches have an inherent normally open type of operation. They can, however, be made to operate as normally closed switches by using a permanent bias magnet to hold the switch closed and energizing the operating coils to produce a magnetic flux which opposes this bias magnet causing the switches to open.

Sealed contact switches can also operate in a latching mode. In a latching relay, the switches are also biased with a permanent magnet which provides a holding flux. Energizing a coil adds sufficient flux to close the switches and they will remain closed until a reverse coil is energized.

Relays suitable for use in many industrial control circuit applications have been constructed by assembling groups of sealed contact switches which are actuated by a common coil. The natural magnetic flux field produced by such a coil emanates within the coil windings, flows out one end of the coil, down the length of the outside, and in the other end to form a complete magnetic circuit.

Many of the prior constructions locate the sealed switches within the coil windings where flux density is at a maximum. In others, the switches are outside the coil and flux concentrators are provided along the outside length of the coil, which concentrators furnish a low reluctance path having a gap across which the sealed contact switches are mounted. All of these prior constructions have one common feature, the contact switches are mounted within the natural flux pattern of the coil with their longitudinal axis in a direction parallel to the axis of the coil. This was considered necessary to maximize the flux density across the switch contacts and thus decrease the size of the coil needed in the relay and increase the efficiency of operation. However, efficiency and coil size are not the only design objectives and at times other desirable features have been compromised in order to minimize coil size and maintain efficient operation. For example, prior switch arrangements result in a relatively wide relay which may not be useful in applications where horizontal space is at a premium. Prior constructions fail to provide the engineer and user the necessary flexibility which they need for numerous applications, with the result that many advantageous features are sacrificed in order to maintain an efficient relay with a reasonable coil size.

SUMMARY OF THE INVENTION

The present invention contemplates a sealed contact relay in which the sealed switches are mounted with their axes substantially perpendicular to the axis of the magnetizing coil. More specifically, the invention includes two energizing coils each surrounding one leg of a U-shaped magnetic yoke, the two ends of the yoke are extended and branch to form two sets of spaced flux fingers, and the sealed contact switches are mounted between these spaced flux fingers to bridge across the gap formed between the two sets of flux fingers.

The flux fingers provide a low reluctance path which actually diverts the magnetic flux in the field produced by the two energizing coils rather than merely concentrating the flux at a given point. This concept relieves the design engineer from the slavish requirement of mounting the sealed contact switches inside the coil winding or immediately outside along its length.

The general objective of the present invention is to provide a sealed contact relay structure having a more flexible and convenient arrangement of the switches with respect to the energizing coil.

A more specific objective of the present invention is to provide an arrangement in which the individual contact switches can be mounted in cartridges which can be easily removed and reversed. Another specific objective of the invention is to provide an economical and reliable means of indicating when the energizing coils are activated. Still another specific objective is to provide an economical means of manually actuating the sealed contact switches.

Figure 2:
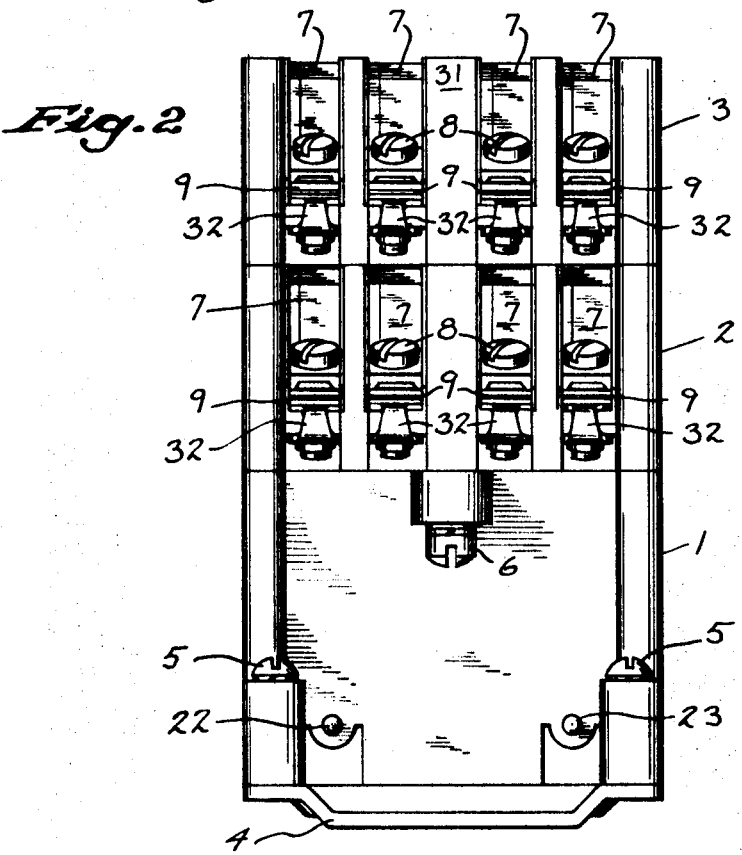

Other features, objects and advantages of the invention will become apparent from the description to follow. BRIEF DESCRIPTION OF THE DRAWINGS FIG. 1 is a top view of a sealed contact relay incorporating the elements of this invention, FIG. 2 is a side view of the same embodiment of the invention, FIG. 3 is an exploded view of portions of a sealed contact relay incorporating the present invention, FIG. 4 is a partial perspective of the relay showing a plug-in rectifier unit, FIG. 5 is an electrical schematic diagram of the sealed contact relay, FIG. 6 is an electrical schematic diagram of the relay when operated in a latching mode, FIG. 7 is a perspective view of a retainer gasket, FIG. 8 is a bottom view of an indicator cap which can be mounted on the top of the relay shown in FIGS. 1 and 2, FIG. 9 is a side view in cross section of a manual actuator which can be mounted on top of the structure shown in FIGS. 1 and 2, FIG. 10 is a side view of a cartridge containing a sealed contact switch with the cover of the cartridge removed, FIG. 11 is a schematic diagram of the manual actuator, and FIG. 12 is a partial top view of the indicator cap. DESCRIPTION OF THE PREFERRED EMBODIMENT As seen in FIGS. 1 and 2, the preferred embodiment of the present invention is a generally rectangular structure comprised of an energizing section 1, and two switch sections 2 and 3. The energizing section 1 is attached to a mounting frame 4 by means of four screws 5. The two switch sections 2 and 3 are stacked on top of the energizing section 1 and held in place by bolts 6. The structure is not necessarily limited to the use of two switch sections, any number of such sections can be stacked on the top of the energizing section 1 and bolted into place.

Each switch section 2 and 3 contains four cartridges 7. Each cartridge fits snugly within a channel in its respective switch section and is held in place by means of two screws 8 inserted through contact flanges 9 located at opposite ends of the cartridge 7. The contact flanges 9 also serve as the electrical terminals to which the external wires are connected. There are detents 7' along one side of each cartridge 7 which are received in corresponding recesses to assure that it is placed in the switch sections 2 or 3 in the proper direction. The detents 7' could be eliminated to provide a reversible cartridge 7 which is desirable for some applications to be explained below. The switch 10 is completely enclosed within the cartridge 7, the cover plate which completes the enclosure having been omitted in FIG. 10 for clarity. The electrical contacts 11 protrude out opposite ends of the switch 10 and are electrically connected to the contact flanges 9. There is enough space inside the cartridge 7 alongside and immediately above and below the switch 10 to allow the insertion of one or two bias magnets. As seen in FIG. 10, a single permanent magnet 12 has been inserted below the switch 10 to create a bias magnetic field.

As shown best in FIG. 3, the energizing section 1 is comprised of two basic elements; a coil section 13 and a yoke 14. The yoke 14 is made of a suitable magnetic material such as laminated silicon steel. It has A U-shaped configuration formed by a base portion 15 and two substantially parallel legs 16 and 17. The coil section 13 is a generally rectangular-shaped block made of a nonconductive material formed with two substantially parallel apertures 18 and 19 passing through it from top to bottom. The legs 16 and 17 of the yoke 14 are terminated to form surfaces 20 and 21. The length of these legs 16 and 17 is sufficient to pass completely through the apertures 18 and 19 when the yoke 14 is placed under the coil section 13.

Wound inside the coil section 13 and around each aperture 18 and 19 are electrical energizing coils (not shown in FIG. 3). As shown in FIGS. 2 and 4, the ends of each coil can be connected to one of the terminal pins 22, 23, 24 and 25 on the sides of the coil section 13. When a DC voltage is applied to one or both of the coils they induce a magnetic flux flow in the yoke 14.

Stacked on top of the energizing section 1 is the first switch section 2. As shown in FIG. 3, the switch section 2 contains two flux finger sets 26 and 27. Each flux finger set 26 and 27 has a horizontal base plate 28, the bottom surface of which is in magnetic contact with one of the surfaces 20 or 21 on the yoke 14 when properly in place. Extending vertically from the top surface of each baseplate 28 are five bar-shaped flux fingers 29 spaced along the length of the baseplate 28. When the flux finger sets 26 and 27 are in place, the flux fingers 29 are aligned to form the sides of four channels, in each of which a cartridge 7 containing a sealed contact switch 10 is mounted. When assembled over the surfaces 20 and 21, the flux finger sets 26 and 27 are spaced apart to form a gap between them. Each switch 10 is, therefore, located between adjacent flux fingers in each flux finger set and bridges the gap between sets 26 and 27.

This configuration forms a complete magnetic circuit. Depending on the polarity of the DC voltage applied, magnetic flux flows through the yoke 14, out of either surface 20 or 21, through a baseplate 28, up the flux fingers 29, through the sealed contact switches 10 to the other flux finger set and back to the yoke 14.

The top switch section 3 is basically an extension of the bottom switch section 2. It allows the addition of four sealed contact switches 10 to the relay. Four channels are formed by bar-shaped flux finger extensions 30, into which the cartridges 7 containing the sealed contact switches 10 are inserted. These extensions 30 are divided into two sets 26 and 27 and are each mounted in the switch section 3 such that their bottom ends abut against the top end of a corresponding flux finger 29 in the switch section 2 below. The extensions 30 provide a low reluctance path for the magnetic flux emanating from the yoke 14. This path deflects a sufficient amount of flux through the four additional sealed contact switches 10 mounted in switch section 3 to actuate them.

By using two switch sections a standard eight-pole relay is formed. A cap (not shown) is then placed on top of the section switch section 3. However, as seen in FIG. 1 the upper ends of the flux finger extensions 30 are exposed so that additional switch sections can be stacked on top to add additional poles. In each of these switch sections 2 and 3 the flux finger sets 26 and 27 are held in place by an appropriately shaped framework 31 made of a rigid electrically and magnetically insulating material. The framework 31 is configured to maintain the four channels between the aligned flux fingers in which the cartridges 7 fit. Threaded retainers 32 are mounted on the framework 31 and aligned to receive the screws 8 used to mount the cartridges 7 and connect the external wiring.

To operate the sealed contact switches 10 properly it is necessary to supply direct current to the energizing coils. The two energizing coils 33 and 34 are shown schematically in FIG. 5. One end of coil 33 is joined to one end of coil 34 and the other end of coil 33 is connected to terminal pin 23. The free end of coil 34 is connected to terminal pin 22. Referring to FIG. 4, a rectifier unit 35 is attached to these terminal pins 22, 23 when it is to be operated off of an AC power source. The rectifier unit 35 has a case 36 made of a rigid nonconductive material and configured to fit against the side of the energizing section 1. Two sockets 37 and 38 are mounted in the case 36 and aligned to connect with terminal pins 22 and 23 when the rectifier unit 35 is plugged in. Two terminal lugs 39 and 40, appropriately designed for connection to external wiring, are located one above each of the sockets 37 and 38. A standard full wave rectifier bridge 41 is mounted in the case 36. The rectifier bridge 41 is connected as shown in FIG. 5 such that when an AC power source is connected to the terminal lugs 39 and 40, positive current will flow from both terminals 39 and 40 into pin 22 through coils 34 and 33 out of pin 23 and to the opposite terminal lug. Of course, if an opposite magnetic flux is desired, the bridge connection can be reversed such that positive current flows into pin 23 and out pin 22. The energizing coils 33 and 34 are wound such that when they are connected in series as shown, they produce a flux in the yoke 14 which adds together to increase the magnetic field.

When the relay is to be operated in a latching mode, energizing coils 33 and 34 are not connected internally. Instead, the terminals of coil 34 are connected to pins 22 and 23 and the terminals of coil 33 are connected to pins 24 and 25 on the opposite side of the energizing section 1. As shown in FIG. 6, a rectifier unit 35 having a rectifier 41 is attached to each of the coils 33 and 34. The terminal lugs 39 and 40 on each of the rectifier units 35 are connected to an AC power source 42. Coil 33 is energized by closing switch 43 connected between coil 33 and the AC current source 42. This coil produces a magnetic flux flowing in one direction in the yoke 14. A second switch 44 is connected between the AC current source 42 and the coil 34. When switch 44 is closed coil 34 is energized and produces a magnetic flux in the yoke 14 opposite in direction to that produced by coil 33.

Sealed contact switches have an inherent characteristic which allows them to be used as a latching switch when supplied with a bias magnetic field. When the proper bias flux is provided a sealed contact switch will remain either in the open or closed position as long as no additional or opposing flux is applied to the switch. A bias field can be provided for any individual switch 10 by placing a permanent magnet 12 inside the cartridge 7 or a permanent magnet 12' directly alongside in the framework 31 as shown in FIG. 10. In any case, energizing one of the coils 33 or 34 will add to the bias flux and energizing the other coil will detract from the bias flux. To illustrate, if a flux produced by coil 34 adds to the bias flux in a sealed contact switch 10, the switch will be closed and remain closed even when the coil 34 is deenergized. If coil 33 is then energized, the flux produced by it will subtract from the bias magnetic flux and the sealed contact switch 10 will open. It will remain open until coil 34 is again energized. By placing the bias magnet 12 in the cartridge 7, the bias field can be reversed by reversing the cartridge 7 in the framework 31. This provides for operating selected switches 10 latched open while others are latches closed and vice versa.

As shown in FIG. 1, the ends of the flux finger extensions 30 are exposed on the top of the switch section 3. When the coils 33 and 34 are energized, magnetic flux flows across the gap between the flux finger set 26 and set 27. This configuration provides for a convenient and unique cap which can be attached as a top for the relay and which indicates when the coils 33 and 34 are energized. FIG. 8 shows the bottom view of an indicator cap 45 which can be attached to the sealed contact relay by passing bolts through two spaced holes 46 in the cap 45 and screwing them into equally spaced holes 49 in the top of the framework 31 of switch section 3. As shown in FIG. 7, a flat rectangular retainer gasket 47 having detents 48 in its surface aligned to press down on the ends of the flux finger extensions 30, can be placed between the indicator cap 45 and the relay. This retainer gasket 47 assures that the extensions 30 are retained in close contact with the flux fingers 29 in the lower switch section 2. The bottom of the cap 45 has a rectangular shaped recess 50. Two indicator holes 51 and 52 pass through the cap 45. They are within the rectangular recess along one of the edges 53 formed by the recess and located with one hole near each corner. An indicator arm 54 having a length slightly less than that of the edge 53 is mounted to pivot on the axis 55 inside and near the center of the recess 50. The indicator arm 54 can pivot between two positions inside the recess 50. In the first position, one end of the pivot arm 54 is aligned directly under indicator hole 52, while in the second position the other end of the indicator arm 54 is aligned under hole 51. A bias spring 56 is attached between the indicator arm 54 and the indicator cap 45 to supply a force which maintains the arm 54 in the first position, that is aligned under hole 52. A crosspiece 57 made of a magnetic material such as soft iron is attached across the indicator arm 54 at about its midpoint.

When the indicator cap 45 is bolted into place on top of the switch section 3 the crosspiece 57 is brought into close proximity to the flux finger extensions 30 and bridges the gap between the sets 26 and 27. As shown in FIG. 12, the bias spring 56 maintains the indicator arm 54 aligned underneath hole 52. In this biased position the crosspiece 57 is not directly in line with any two opposite fingers and thus does not form a minimum reluctance bridge across the gap between flux finger sets 26 and 27. The crosspiece 57 can, therefore, be said to be not aligned between the flux finger sets. Consequently, when the coils 33 and 34 are energized the flux flowing across the gap will create a pivoting force on the crosspiece 57 tending to align it in a minimum reluctance path between the two flux finger sets. This force is opposed to that created by the bias spring 56 and causes the indicator arm 54 to pivot about the axis 55 to the second position where it covers the hole 51. The indicator holes 51 and 52 are appropriately labeled on the top of the cap 45 to indicate the unenergized and energized states.

When the sealed contact relay is to be operated in the latching mode, it is desirable, and in some applications required, that a manual means of actuating the switches be provided. Again, the exposed ends of the flux finger extensions 30 at the top of the relay provide a convenient configuration for such a manual actuator. A manual actuator 58 is shown in FIG. 9. It has a rectangular outer shell 59 made of a suitable nonconductive material with an open bottom and a slot 60 in the top. There are two flanges 61 located on two of the opposing sides of the shell 59. Each flange 61 has a vertical hole 62 drilled through it and aligned with corresponding holes in the top of the switch section 3. Bolts (not shown) are passed through the holes 62 to mount the manual actuator 58 on top of the relay. Slidably mounted inside the shell 59 is a carriage 63 having a knob 64 protruding through the slot 60 in the top of the shell 59. When the manual actuator 58 is mounted, carriage 63 can be slid manually by means of the knob 64 across the gap between the flux finger sets 26 and 27.

Attached to the bottom of the carriage 63, and in close proximity to the ends of the flux finger extensions 30, is a rectangular shaped magnet 65. This magnet 65 has a rectangular bottom face 66, which has a length in the direction of the sliding motion less than the interior of the shell but greater than the distance between the flux finger sets 26 and 27. As shown schematically in FIG. 11, the magnet 65, made of a ferrite material, has its face 66 alternately polarized along its length. A center portion 67 is magnetized with one polarity on the bottom face 66 and this section is abutted on both sides in the lengthwise direction by side portions 68 and 69 having their bottom faces 66 magnetized with the opposite polarity. In FIG. 11, the bottom face of the center portion 67 is designated a south pole, while the bottom faces of the side portions 68 and 69 are designated north poles. These, of course, could be reversed. The strength of the magnet 65 depends on the number of switch sections to be used in the relay.

The magnet 65 in essence defines two sets of poles—the pole on the bottom face of section 67 and the pole on the bottom face of section 68 constituting one set and the poles on the bottom faces of the sections 67 and 69 constituting the other—which are oppositely oriented.

When the knob 64 is centered in the slot 60 the magnet 65 is in a neutral position in which portions intermediate the poles are aligned over the flux finger sets 26 and 27, and as a result there is no operative flux flow in either direction. Shifting the magnet 65 in either direction, however, will bring one or the other pole set into alignment with the finger sets 26, 27.

As previously explained, whenever the relay is operated in the latching mode a bias magnetic field flows through the sealed contact switches 10. Such a bias field can be provided by individual permanent magnets 12 mounted in each cartridge 7 or individual permanent magnets 12' mounted in the framework 31 beneath each cartridge 7. The bias magnet 70 in FIG. 11 represents either of these arrangements in schematic form. The magnet 70 is strong enough to provide a holding flux, but is not strong enough to close the switches 10. As shown schematically in FIG. 11, the magnet 70 has its north pole oriented with flux finger set 26, and thus can be said to be in additive alignment with the pole set defined by the bottom faces of the sections 67, 68 and in reverse alignment with respect to the pole set defined by the bottom faces of the sections 67, 69. By sliding the magnet 65 to the right as seen in FIG. 11, the pole set defined by the bottom faces of the sections 67, 68 comes into alignment with the finger sets 26, 27 with the north pole 68 aligned with the flux finger set 26 and the south pole 67 aligned with the flux finger set 27. The flux of the magnet 65 then adds to the flux of the magnet 70 and the switches 10 are closed. When the magnet 65 is moved back to neutral position the bias flux of the magnet 70 alone holds the switches 10 closed. By moving the magnet 65 to the left, or towards the flux finger set 26, the pole set defined by sections 67, 69 comes into alignment, with the south pole aligned with the flux finger set 26 and the north pole aligned with the flux finger set 27. The flux flow through the switches 10 developed by the magnet 65 then opposes that of the bias magnet 70, causing the switches 10 to open. The three-pole configuration of the magnet 65 allows the provision of two sets of poles in the most efficient way, but two oppositely disposed two-pole magnets could be used in place of the magnet 65 if desired.

As can be seen by the foregoing description, the configuration discovered by the applicant provides a sealed contact relay having great flexibility both for the design engineer and the user. The relay can be operated directly off of a DC power source or off of an AC power source simply by changing the plug-in rectifier unit 35. By adding an additional plug-in rectifier unit 35 and a bias magnet, the AC relay is converted to a latching relay. Unlike prior devices none of the switch positions are taken up by rectifier units. In addition, the number of switch positions available is quite flexible because it is an easy matter to add or take off switch sections.

The cartridges 7 could, by eliminating the detents 7', be designed for individual removal and reversal, and then a relay could be made in which each switch 10 could be operated as either a normally open or normally closed contact. In this configuration both bias magnets 12 and 12' as shown in FIG. 10, would be placed in the magnetic circuit alongside each switch 10. Alternatively, the bias magnets 12' in the framework 31 could be replaced by a single magnet in the base portion 15 of the yoke 14 as shown schematically in FIG. 11 by the magnet 70. If the cartridge 7 were placed in the relay in one direction the two bias fields would be additive and the switch 10 would be closed. If the cartridge 7 were removed and reversed, the flux produced by the bias magnets 12 and 12' would cancel each other and the switch 10 would be normally open. With this arrangement, the energizing coils 33 and 34 would be wound to produce a flux when energized which opposes that of the bias magnet 12'.

Despite the many advantages provided by this invention, relay efficiency and coil size have not been sacrificed. The switches 10 are located in channels formed by the aligned flux fingers and, consequently, there is an efficient transfer of magnetic flux through the switches 10 from the surrounding magnetic circuit. By surrounding the switches 10 with flux fingers, the total reluctance of the magnetic circuit is minimized and, therefore, the power consumed and the coil size needed to actuate the switches 10 is minimized.

Although a preferred embodiment has been shown, modification can be made without departure from the spirit of the invention. For example, although two coils, one around each leg of the yoke, provides for a very versatile relay, one coil of sufficient strength around one leg or the base of the yoke could be used. Further, the flux fingers, while they are advantageous in diverting flux, may not be absolutely necessary in some applications in that switches could be laid directly across the ends of the yoke legs 16, 17. In view of these and other possible variations the invention is not intended to be limited except as specifically required by the following claims.

I claim:

1. In a relay having sealed contact switches the combination comprising:
   a U-shaped yoke having a base portion and two leg portions, each leg extending in the same direction from an end of said base portion and terminating with an end face;
   an energizing coil wound around said yoke;
   two flux finger sets each comprised of a plurality of spaced parallel flux fingers and each set mounted on one of said end faces such that the flux fingers align to form a plurality of channels; and
   a plurality of sealed contact switches each contained in a cartridge that is removably mounted in one of said channels.

2. In a relay having sealed contact switches the combination comprising:
   an energizing section containing a U-shaped yoke having a base portion and two leg portions each leg having an energizing coil around it and terminating in an end face; and
   a switch section containing two flux finger sets spaced apart to form a gap and aligned to form a plurality of channels in which the sealed contact switches are received and bridge the gap between the flux finger sets, each flux finger set being mounted to make magnetic contact with one of said end faces when the switch section is connected to the energizing section.

3. The combination of claim 2 wherein a rectifier unit is removably attached to the side of said energizing section and connected to a coil.

4. The combination of claim 2 wherein there is an indicator means attached to said switch section including an indicator arm pivotal between two positions, a magnetic piece on the arm which is in alignment between the two sets of flux fingers when the arm is in one position and not in alignment between the sets of flux fingers when the arm is in its other position, and means to bias the arm toward its said other position.

5. The combination of claim 2 wherein there is a bias magnet having opposite poles operatively associated with respective flux finger sets; and there is a manual actuator comprising an actuator magnet means defining two oppositely disposed sets of poles, said actuator magnet means having a central position in which neither of its sets of poles is operatively associated with the flux finger sets and being manually movable in one direction to a position in which one of its pole sets is operatively associated with respective flux finger sets in additive alignment with the bias magnet and is manually movable in the other direction to a position in which the other of its pole sets is operatively associated with respective flux finger sets in reverse alignment with the bias magnet.

6. The combination of claim 2 wherein said sealed contact switches are contained in cartridges which are reversibly mounted in said channels and have permanent bias magnets in them.

7. The combination of claim 2 wherein said sealed contact switches are contained in cartridges which are reversibly mounted in said channels and have permanent bias magnets in them, and there is a second bias magnet mounted such that when the cartridges are placed in said channels in one direction the switches are normally open and when said cartridges are reversed in direction in said channels the switches are normally closed.

8. The combination of claim 2 wherein there is a second switch section atop the first and containing two sets of flux finger extensions abutting against the outer ends of respective flux fingers of the first section.

9. The combination of claim 5 wherein the actuator magnet comprises a single member with an elongated surface facing the flux finger sets that is magnetized to define one pole near its center and opposite poles on either side thereof.